(12) United States Patent
Ito et al.

(10) Patent No.: US 12,090,940 B2
(45) Date of Patent: Sep. 17, 2024

(54) ABNORMALITY ESTIMATING APPARATUS, ABNORMALITY DETECTION APPARATUS, ABNORMALITY DETECTION METHOD, AND ABNORMALITY DETECTION PROGRAM

(71) Applicant: NIPPON TELEGRAPH AND TELEPHONE CORPORATION, Tokyo (JP)

(72) Inventors: Hiroaki Ito, Tokyo (JP); Shin Murata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 123 days.

(21) Appl. No.: 17/632,527

(22) PCT Filed: Aug. 5, 2019

(86) PCT No.: PCT/JP2019/030717
§ 371 (c)(1),
(2) Date: Feb. 3, 2022

(87) PCT Pub. No.: WO2021/024351
PCT Pub. Date: Feb. 11, 2021

(65) Prior Publication Data
US 2022/0289131 A1    Sep. 15, 2022

(51) Int. Cl.
*B60R 21/0132*    (2006.01)
*B60R 21/013*    (2006.01)
*B60W 30/08*    (2012.01)

(52) U.S. Cl.
CPC ......... *B60R 21/0132* (2013.01); *B60W 30/08* (2013.01); *B60R 2021/01302* (2013.01); *B60W 2400/00* (2013.01)

(58) Field of Classification Search
CPC ..... B60R 21/0132; B60R 2021/01302; B60W 30/08; B60W 2400/00; G01H 1/003; G01H 17/00; G01P 15/0891; G07C 5/00
See application file for complete search history.

(56) References Cited

U.S. PATENT DOCUMENTS

2002/0184062 A1    12/2002  Diaz
2003/0065431 A1*    4/2003  Ota ..................... B60R 21/0133
                                            340/436

(Continued)

FOREIGN PATENT DOCUMENTS

JP    2006135412 A  *  5/2006
JP    2017526020 A     9/2017

OTHER PUBLICATIONS

Ide et al. (2015) "Anomaly detection and change detection" Machine Learning Professional Series, Kodansha, Aug. 7, 2015.

(Continued)

*Primary Examiner* — Isaac G Smith
*Assistant Examiner* — Nikki Marie M Molina

(57) ABSTRACT

Provided is an anomaly detection device that acquires a degree of anomaly required for anomaly detection when a feature pattern of time series data changes over time. The anomaly detection device is a device that detects the degree of anomaly in the time series data. The anomaly detection device includes a first acquisition unit, a prediction unit, and an anomaly degree acquisition unit. The first acquisition unit acquires, from a first section that is a partial section of the time series data, a dynamic feature pattern of the first section. The prediction unit predicts data of a second section that is a partial section of the time series data later than the first section by using the feature pattern. The anomaly degree acquisition unit acquires the degree of anomaly based (Continued)

on a difference between the predicted second section data and actual data of the second section.

18 Claims, 12 Drawing Sheets

(56) References Cited

U.S. PATENT DOCUMENTS

2015/0382085 A1    12/2015  Lawrie-Fussey et al.
2017/0069144 A1*    3/2017  Lawrie-Fussey .... G06Q 10/083

OTHER PUBLICATIONS

Tu et al. (2014) "On Dynamic Mode Decomposition: Theory and Applications" Journal of Computational Dynamics, vol. 1, No. 2, pp. 391-421.

* cited by examiner

---PRIOR ART---

ABNORMALITY ESTIMATING APPARATUS, ABNORMALITY DETECTION APPARATUS, ABNORMALITY DETECTION METHOD, AND ABNORMALITY DETECTION PROGRAM

CROSS-REFERENCE TO RELATED APPLICATIONS

This application is a U.S. National Stage Application filed under 35 U.S.C. § 371 claiming priority to International Patent Application No. PCT/JP2019/030717, filed on 5 Aug. 2019, the disclosure of which is hereby incorporated herein by reference in its entirety.

TECHNICAL FIELD

The present invention relates to an anomaly estimation device, an anomaly detection device, an anomaly detection method, and an anomaly detection program in time series data in which a feature pattern may change over time.

BACKGROUND ART

An example of time series data in which a feature pattern may change over time is data related to vibration acquired by a sensor mounted on a vehicle. A typical example of such an in-vehicle sensor is a dashboard camera, which has a mechanism that, in response to detection of an acceleration of more than a preset threshold value (e.g., 0.2 G), determines that the vehicle has crashed and thus detects an anomaly.

In the present invention, as typical time series data, time series data related to vibration acquired by an in-vehicle sensor is handled. However, the time series data to be handled is not limited to time series data related to vibration acquired by an in-vehicle sensor as long as it is time series data in which a feature pattern may change over time. A technique of identifying an anomaly from general time series data is called anomaly detection and change detection, for which several methods have been proposed in, for example, NPL 1. Further, NPL 2 discloses a technique related to dynamic mode analysis.

CITATION LIST

Non Patent Literature

[NPL 1] Takeshi Ide, Masaru Sugimoto, "Anomaly Detection and Change Detection", Machine Learning Professional Series, Kodansha, 2015.
[NPL 2] J. H. Tu, C. W. Rowley, D. M. Luchtenburg, S. L. Brunton, and J. N. Kutz, "On Dynamic Mode Decomposition: Theory and Applications", JCD, vol. 1, no. 2, pp. 391-421, December 2014.

SUMMARY OF THE INVENTION

Technical Problem

However, fora dashboard camera, it is difficult to detect a weak crash event of less than the threshold value (e.g., the side surface of the vehicle body having been rubbed against a wall, the bottom surface of the vehicle body having been rubbed against a curb, etc.) as an anomaly. Therefore, the date and time when the vehicle body may be damaged cannot be identified unless all images from the dashboard camera are checked. Therefore, for a vehicle available for multiple users (e.g., a shared car, a rental car, a company car, etc.), even if the vehicle manager finds a scratch on the vehicle body, it is necessary to check the images continuously until an image when the scratch was made is found in order to check who was driving the vehicle. In addition, it is unclear as to whether the techniques disclosed in NPL 1 and NPL 2 can be used as techniques for detecting an anomaly from time series data, such as time series data related to vehicle vibration, in which a feature pattern may change over time.

A first object of the present invention is to provide an anomaly estimation device capable of limiting the images to be checked to investigate the cause of a scratch on a vehicle available for multiple users. A second object of the present invention is to provide an anomaly detection device capable of acquiring a degree of anomaly required for anomaly detection even when a feature pattern of time series data changes over time.

Means for Solving the Problem

An anomaly estimation device of the present invention is an anomaly estimation device for estimating the time when an anomaly occurred in a vehicle available for multiple users. The anomaly estimation device of the present invention includes a sensor, a prediction unit, an anomaly degree acquisition unit, and an anomaly determination unit. The sensor is installed in a vehicle to acquire time series data related to vibration. The prediction unit predicts, based on first section data that is data of a first section that is a partial section of the time series data, data of a second section that is a partial section of the time series data later than the first section to obtain predicted second section data. The anomaly degree acquisition unit acquires a degree of anomaly in the second section based on a difference between the predicted second section data and second section data that is actual data of the second section in the time series data. The anomaly determination unit determines whether or not an anomaly has occurred in the second section based on the acquired degree of anomaly.

An anomaly detection device of the present invention is an anomaly detection device that detects a degree of anomaly in time series data. The anomaly detection device of the present invention includes a first acquisition unit, a prediction unit, and an anomaly degree acquisition unit. The first acquisition unit acquires, from a first section that is a partial section of the time series data, a dynamic feature pattern of the first section. The prediction unit predicts data of a second section that is a partial section of the time series data later than the first section by using the feature pattern to obtain predicted second section data. The anomaly degree acquisition unit acquires a degree of anomaly based on a difference between the predicted second section data and actual data of the second section in the time series data.

Effects of the Invention

According to the anomaly estimation device of the present invention, at least a range where there is no anomaly can be excluded, so that it is possible to limit images to be checked to investigate the cause of a scratch on a vehicle available for multiple users. According to the anomaly detection device of the present invention, the predicted second section data is obtained based on the dynamic feature pattern, so that it is possible to acquire the degree of anomaly required for anomaly detection even when the feature pattern of the time series data changes over time.

DESCRIPTION OF EMBODIMENTS

Embodiments of the present invention will be described below in detail. Note that components having the same function are given the same numeral, and duplicate description will be omitted.

First Embodiment

<Candidate 1 for a Solution Different from the Present Invention>

Figure 1:
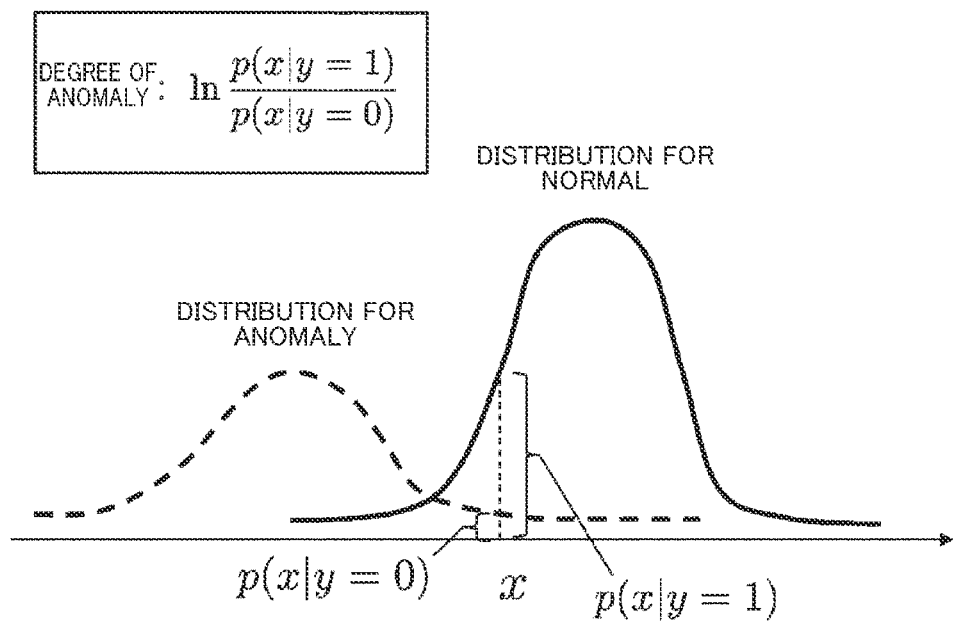
FIG. 1 illustrates an example of probability distributions for normal and anomaly.

As a solution, a large amount of observation data for normal and observation data for anomaly are prepared to generate probability distributions. FIG. 1 illustrates an example of probability distributions for normal and anomaly. There may be a method in which, when target observation data is obtained, conditional probabilities p(x|y=1) and p(x|y=0) are calculated, and a probability density ratio is calculated as follows:

ln(p(x|y=1)/p(x|y=0)), which is a degree of anomaly. However, since the situation inside a vehicle changes from moment to moment, it is not realistic to collect a large amount of data that covers all normal patterns and all anomaly patterns. Therefore, it is difficult to estimate the normal and anomaly probability distributions. As a result, Candidate 1 for a solution cannot be used in the present invention.

<Candidate 2 for a Solution Different from the Present Invention>

Figure 2:
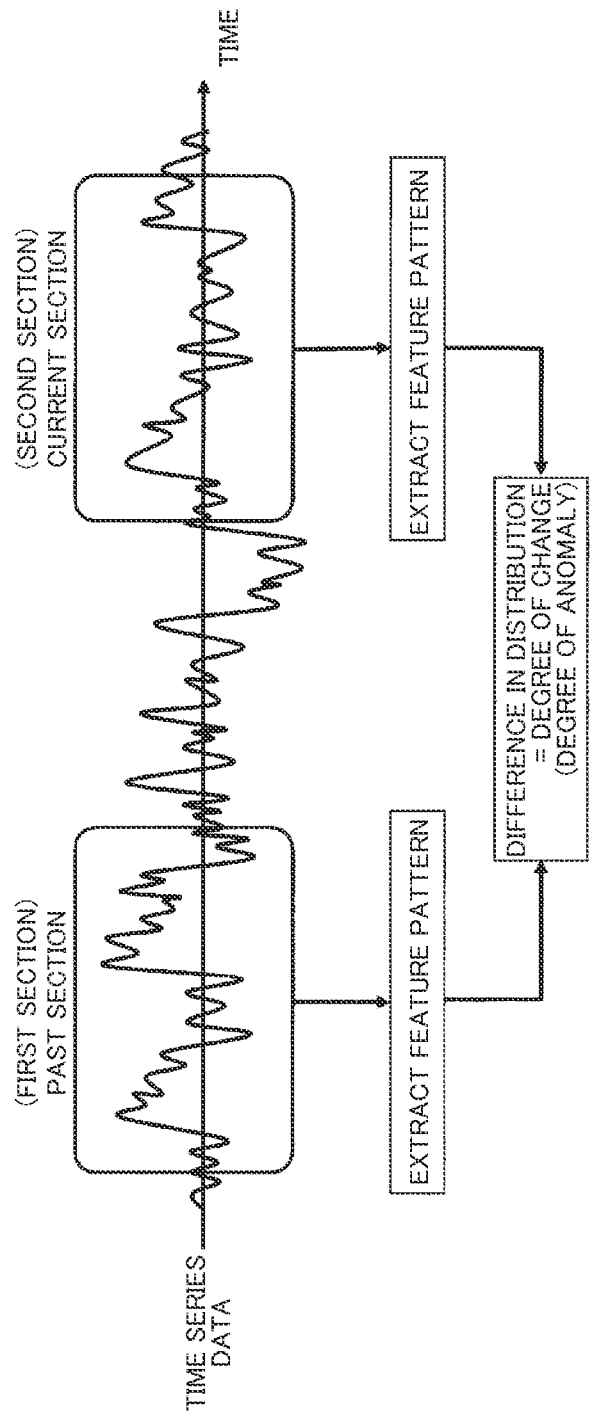
FIG. 2 illustrates the outline of a method using a singular spectrum transformation.

FIG. 2 illustrates a method of Candidate 2. This is a method using the singular spectrum transformation disclosed in NPL 1. A degree of difference between past and current probability distributions (probability density ratio) is evaluated using the subspace method. In the singular spectrum transformation, as illustrated in FIG. 2, feature patterns are extracted by singular value decomposition of time series data of past and current sections, and a degree of change is calculated from the size of an overlap between a subspace where a past feature pattern is present and a subspace where a current feature pattern is present. Note that the current section means a section for which the degree of change is to be calculated. Specifically, the degree of change is calculated as follows.

Figure 3:
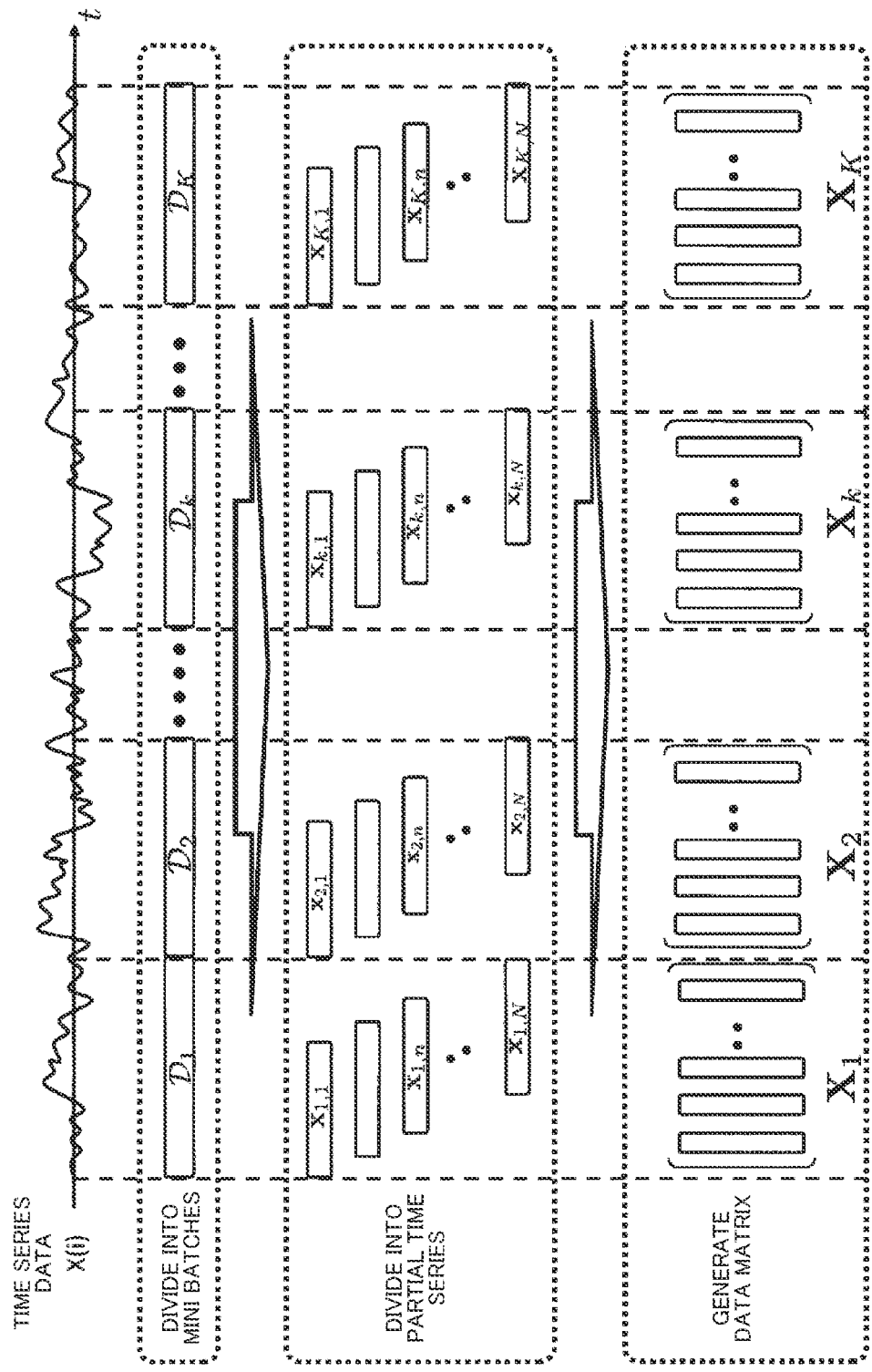
FIG. 3 illustrates a procedure of generating a data matrix.

FIG. 3 illustrates a procedure of generating a data matrix. Here, K, M, N are integers of 2 or more, n is an integer of 1 or more and N or less, L is an integer of 1 or more, k is an integer of 1 or more and K or less, i and r are each an integer of 1 or more, t is an integer of 1 or more and M+N−1 or less, [ ] is a symbol indicating a matrix in which numerical values are arranged in the row direction or in which column vectors are arranged in the row direction, T is a symbol indicating transpose, and x(i) is time series data.

Time series data $x(1), \ldots, x(K(M+N-1))$ is divided by every M+N−1 sections to generate sections $D_1, D_2, \ldots, D_k, \ldots, D_x$ which have elements of the time series data. $D_k$ is a section having section data $x(1+(k-1)(M+N-1)), \ldots, x(k(M+N-1))$. Note that $D_k$ may be expressed as:

$$D_k = [x(1+(k-1)(M+N-1)) \ldots x(k(M+N-1))]^T,$$

which is a column vector having M+N−1 elements. The section data $D_k$ is divided into N partial time series each of which are a partial time series having a window length (length of the partial time series) M and a shift width of 1. The nth partial time series $x_{k,n}$ of the kth section $D_k$ has M elements of time series data $x(n+(k-1)(M+N-1)), \ldots, x(n+(k-1)(M+N-1)+M-1)$, and is expressed as:

$$x_{k,n} = [x(n+(k-1)(M+N-1)), \ldots, x(n+(k-1)(M+N-1)+M-1)]^T,$$

which is a column vector. Note that for restrictions on expression, the column vector is expressed as above, but this expression means the same as:

$$x_{k,n} = \begin{bmatrix} x(n+(k-1)(M+N-1)) \\ \vdots \\ x(n+(k-1)(M+N-1)+M-1) \end{bmatrix}. \quad [\text{Math. 1}]$$

The same applies to the following. Next, N elements of partial time series $x_{k,1}, \ldots, x_{k,N}$ of the section $D_k$ are put together into a data matrix $X_k$ as:

$$X_k = [X_{k,1} \ldots x_{k,n} \ldots x_{k,N}].$$

Note that, although the matrix is expressed as above due to restrictions on expression, this expression means the same as:

$$x_k = \begin{bmatrix} | & & | & & | \\ x_{k,1} & \cdots & x_{k,n} & \cdots & x_{k,N} \\ | & & | & & | \end{bmatrix}. \quad [\text{Math. 2}]$$

The lines extending up and down of $x_{k,1}$, $x_{k,n}$, and $x_{k,N}$ indicate that $x_{k,1}$, $x_{k,n}$, and $X_{k,N}$ are each a column vector.

Figure 4:
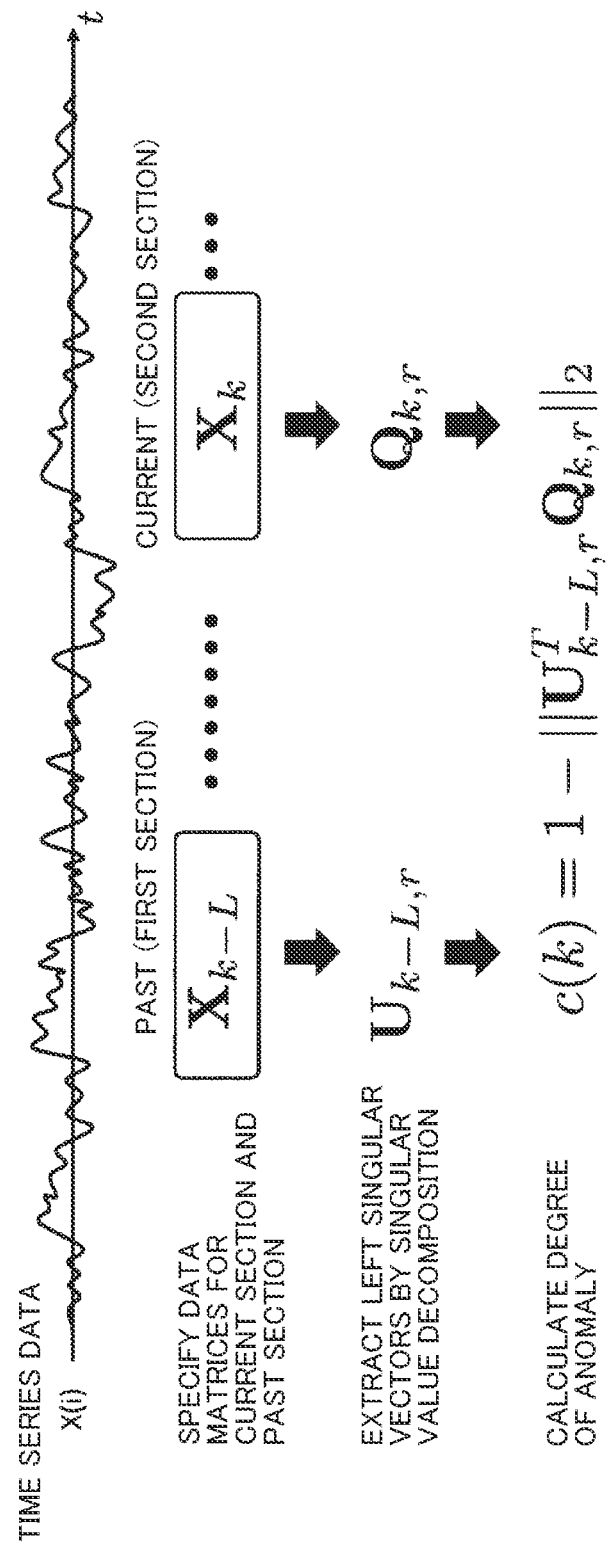
FIG. 4 illustrates a method of calculating a degree of change using a singular spectrum transformation.

Here, the kth section $D_k$ is set as the current section (second section), and the section $D_{k-L}$ earlier by L sections is set as a past section (first section) to be compared. FIG. 4 illustrates a method of calculating a degree of change in Candidate 2. Note that L is called a lag and represents a relative position between the past section (first section) and the current section (second section). Singular value decomposition is performed on the data matrices $X_{k-L}$ and $X_k$ of the first section and the second section, respectively, and left singular vectors of the top r singular values are obtained. A matrix of singular vectors $u_{k-L,1}, u_{k-L,2}, \ldots, u_{k-L,r}$ extracted from the data matrix $X_{k-L}$ for the first section is defined as:

$$U_{k-L,r}=[u_{k-L,1}, u_{k-L,2}, \ldots, u_{k-L,r}].$$

Here, $u_{k-L,1}, u_{k-L,2}, \ldots, u_{k-L,r}$ are each a column vector. Similarly, a matrix of singular vectors $q_{k,1}, q_{k,2}, \ldots, q_{k,r}$ extracted from the data matrix $X_{k-L}$ for the second section is defined as:

$$Q_{k,r}=[q_{k,1}, q_{k,2}, \ldots, q_{k,r}].$$

Here, $q_{k,1}, q_{k,2}, \ldots, q_{k,r}$ are each a column vector. Note that r may be set to a different value between the first section and the second section.

A degree of change c(k) is:

$$c(k)=1-\|U_{k-L,r}^T Q_{k,r}\|_2.$$

Here, $\| \|_2$ represents a matrix 2-norm, and $\|U_{k-L,r}^T Q_{k,r}\|_2$ is equal to the maximum singular value of $U_{k-L,r}^T Q_{k,r}$.

Figure 5:
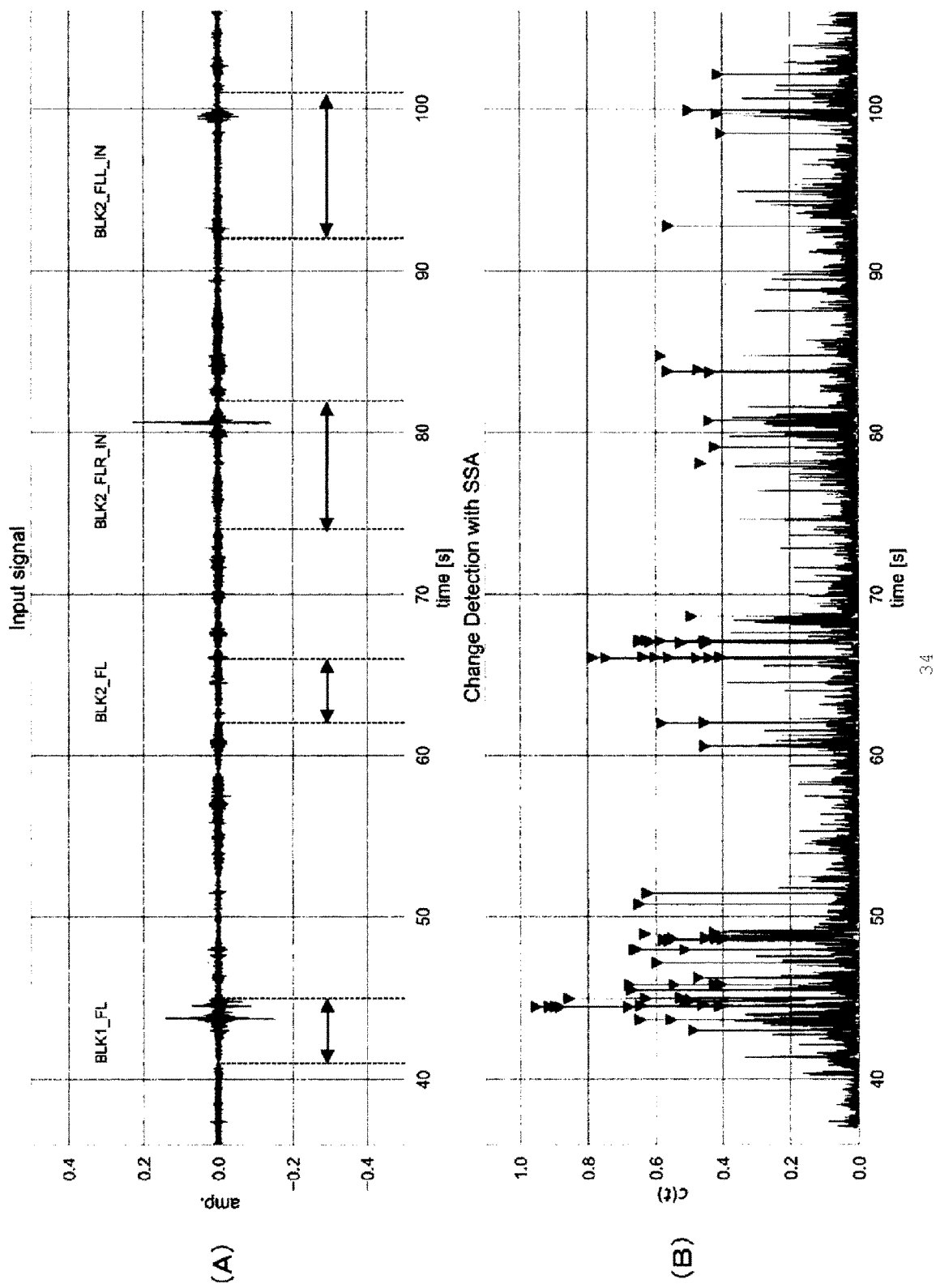
FIG. 5 illustrates results of change detection using a singular value spectrum transformation for time series data actually observed in a vehicle.

FIG. 5 illustrates results of change detection using a singular value spectrum transformation for time series data actually observed in a vehicle. The vertical axis in (A) of FIG. 5 indicates the amplitude of input time series data, the vertical axis in (B) of FIG. 5 indicates the degree of change, and the horizontal axis of both indicates time. The sampling frequency of time series data used in an experiment was 16 kHz. Ranges indicated by arrows in (A) of FIG. 5 are sections in which an anomaly is be detected. In this experiment, a partial time series was used in which the length was set to M=256, and a data matrix was used in which the number of columns was set to N=128 and the lag was set to L=128. Further, r which represents the number of extracted singular vectors was set to the number of top singular vectors having singular values whose cumulative contribution rate is up to 80%. In (B) of FIG. 5, a threshold value for a degree of change is set to 0.4, and points where the degree of change exceeds the threshold value are each marked with a triangle in order to emphasize the points determined to be anomalies. From FIG. 5, it can be seen that some points are determined to be anomalies in sections other than the sections for which an anomaly is be detected. Further, referring to (A) of FIG. 5, large vibrations around 43 seconds, 81 seconds, and 99 seconds are found. From the results of (B) of FIG. 5, it can be seen that only these three places can be detected even if the threshold value is changed as appropriate.

In the technique of NPL 1, a feature pattern is extracted by singular value decomposition for the section of interest. This corresponds to decomposing the eigenvalues of a variance matrix of a data matrix for the section of interest. Accordingly, since only the section of interest is focused on and direction vectors are extracted such that their variance becomes large, only the static feature patterns assuming that the section of interest is stationary are successfully extracted. However, in an environment where the situation changes from moment to moment, such stationarity cannot be assumed, so that it is believed that features fail to be extracted correctly and thus the error in the degree of change becomes large, resulting in an increase in false detection.

<Anomaly Estimation Device of the Present Invention>

Figure 6:
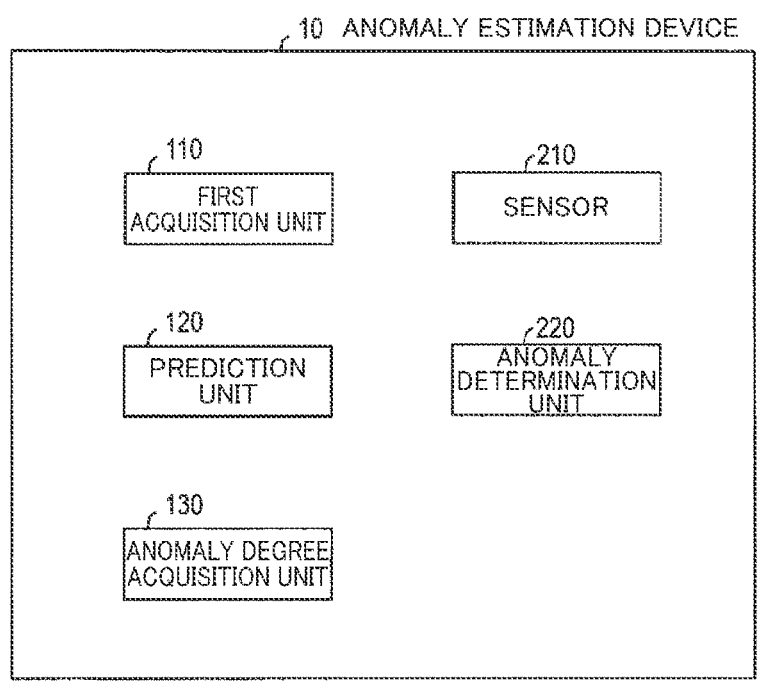
FIG. 6 illustrates a functional configuration example of an anomaly estimation device.
Figure 7:
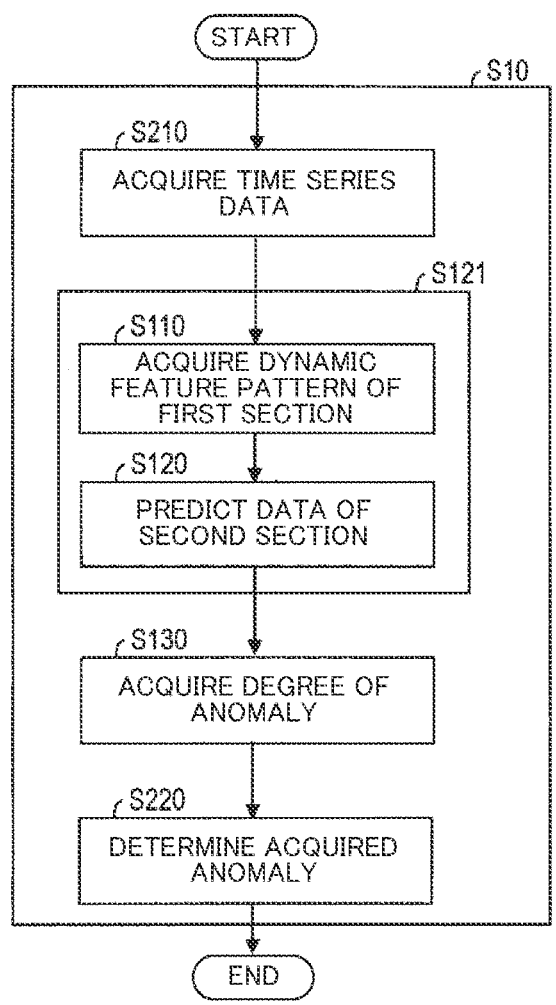
FIG. 7 illustrates an example of a processing flow of the anomaly estimation device.
Figure 8:
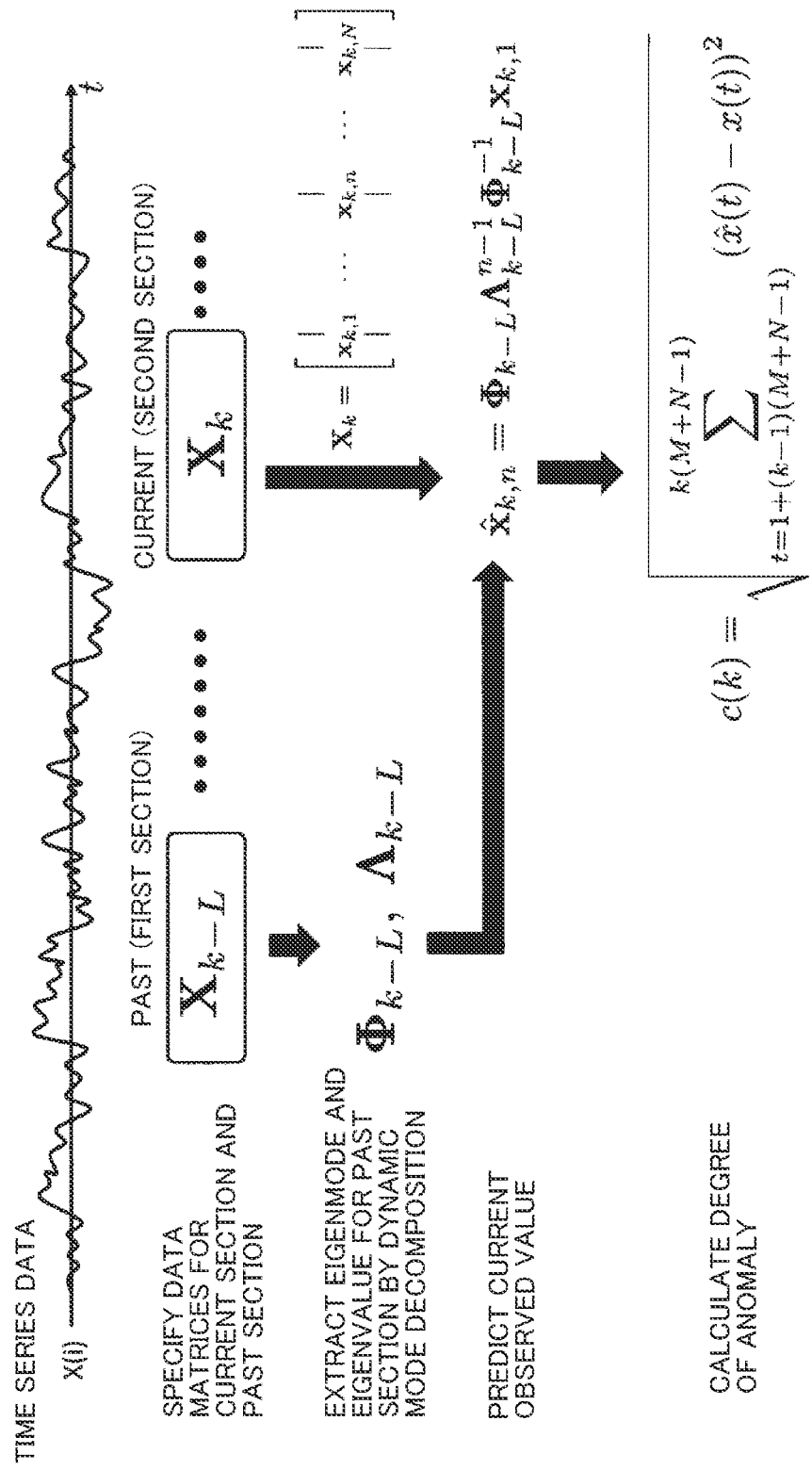
FIG. 8 illustrates a method according to the present invention.

FIG. 6 illustrates an example of a functional configuration of an anomaly estimation device, and FIG. 7 illustrates an example of a processing flow of the anomaly estimation device. FIG. 8 illustrates a method according to the present invention. An anomaly estimation device 10 is a device for estimating the time when an anomaly occurred in a vehicle available for multiple users. The anomaly estimation device 10 includes a sensor 210, a first acquisition unit 110, a prediction unit 120, an anomaly degree acquisition unit 130, and an anomaly determination unit 220. The sensor 210 is installed in a vehicle and acquires time series data x(i) related to vibration (S210). Note that, in the following, a first section (past section) is a section as a reference for obtaining a degree of anomaly, and a second section (current section) is a section for which the degree of anomaly is to be obtained.

The first acquisition unit 110 acquires a dynamic feature pattern of the first section (past section) $D_{k-L}$, that is a partial section of the time series data x(i) (S110). The dynamic feature pattern is a feature pattern related to a periodic vibration and a damping rate of the periodic vibration. In other words, what periodic vibration causes changes over time and what damping (increase) rate the periodic vibration has are extracted. More specifically, a dynamic eigenmode m (matrix in which M-dimensional column vectors are arranged for the number of ranks) and an eigenvalue $\Lambda=\text{diag}(\lambda_1)$ for the first section are obtained by dynamic mode decomposition. Next, the dynamic mode decomposition will be described. Note that the "damping rate" described herein includes a case where it increases when the positive or negative sign is reversed.

Similar to the description of Candidate 2 with reference to FIG. 3, the time series data x(i) is divided by every M+N−1 sections to obtain sections $D_1, D_2, \ldots, D_k, \ldots, D_K$. The (k−L)th section $D_{k-L}$ is the first section (past section), and the kth section $D_k$ is the second section (current section). The first acquisition unit 110 generates a partial time series $x_{k,1}, \ldots, x_{k,N}$, which are each a column vector, in which the nth partial time series $x_{k-L,n}$ for the section $D_{k-L}$ is:

$$x_{k-L,n}=[x(n+(k-L-1)(M+N-1)), \ldots, x(n+(k-L-1)(M+N-1)+M-1)]^T,$$

The first acquisition unit 110 generates a matrix $X_{k-L,1}=[x_{k,1} \cdots x_{k,n} \cdots x_{k,N-1}]$ and a matrix $X_{k-L,2}=[x_{k,2} \cdots x_{k,n} \cdots x_{k,N}]$. Note that the matrix $X_{k-L,1}$ and the matrix $X_{k-L,2}$ are expressed as the above for convenience of expression, but these expressions mean the same as the following:

$$X_{k-L,1} = \begin{bmatrix} | & & | & & | \\ x_{k-L,1} & \cdots & x_{k-L,n} & \cdots & x_{k-L,N-1} \\ | & & | & & | \end{bmatrix} \quad [\text{Math. 3}]$$

$$X_{k-L,2} = \begin{bmatrix} | & & | & & | \\ x_{k-L,2} & \cdots & x_{k-L,n} & \cdots & x_{k-L,N} \\ | & & | & & | \end{bmatrix}. \quad [\text{Math. 4}]$$

The first acquisition unit 110 uses a low-rank approximated pseudo-inverse matrix $X_{k-L,1}^+$ obtained based on the result of singular value decomposition for $X_{k-L,1}$ to obtain a linear operator A as:

$$A=X_{k-L,2} X_{k-L,1}^+.$$

Then, the first acquisition unit 110 obtains an eigenmode $\Phi_{k-L}$ and an eigenvalue $\Lambda_{k-L}$ so as to satisfy:

$$A=\Phi_{k-L} \Lambda_{k-L} \Phi_{k-L}^{-1}$$

(S110).

Note that the detailed procedure for obtaining the linear operator A from the singular value decomposition using a pseudo-inverse function is as follows.

First, performing singular value decomposition on $X_{k-L,1}$, a singular matrix $\Sigma_{k-L,1}$ and unitary matrices $U_{k-L,1}, V_{k-L,1}$ are obtained as:

$$X_{k-L,1}=U_{k-L,1} \Sigma_{k-L,1} V_{k-L,1}^T.$$

Approximating these up to the number of ranks r results in:

$$X_{k-L,1,r} = U_{k-L,1,r} \Sigma_{k-L,1,r} V_{k-L,1,r}$$

The low-rank approximated pseudo-inverse matrix $X_{k-L,1}^+$ can be obtained as:

$$X_{k-L,1}^+ = V_{k-L,1,r} \Sigma_{k-L,1,r}^{-1} U_{k-L,1,r}^T.$$

Thus, by the singular value decomposition and low-rank approximation for $X_{k-L,1}$, the linear operator A can be obtained as:

$$A = X_{k-L,2} V_{k-L,1,r} \Sigma_{k-L,1,r}^{-1} U_{k-L,1,r}^T.$$

In this way, the low-rank approximation makes it possible to reduce the computation cost.

Further, the detailed procedure for obtaining the eigenmode $\Phi_{k-L}$ and the eigenvalue $\Lambda_{k-L}$ is as follows. Again, the low-rank approximation is used to reduce costs.

First, $\tilde{A}$ is obtained as:

$$\tilde{A} = U_{k-L,1,r}^T A U_{k-L,1,r} = U_{k-L,1,r} X_{k-L,2} V_{k-L,1,r} \Sigma_{k-L,1,r}^{-1}.$$

By eigenvalue decomposition, a matrix W in which rows of eigenvectors are arranged to satisfy $$\tilde{A} W = W \Lambda$$

and an eigenvalue $\Lambda_{k-L} = \mathrm{diag}(\lambda_j)$ are obtained. Then, the unique mode $\Phi_{k-L}$ is obtained as:

$$\Phi_{k-L} = X_{k-L,2} V_{k-L,1,r} \Sigma_{k-L,1,r}^{-1} W.$$

The eigenmode $\omega_{k-L}$ and the eigenvalue $\Lambda_{k-L}$ obtained in this way satisfy the following relation:

$$A \Phi_{k-L} = \Phi_{k-L} \Lambda.$$

The prediction unit 120 predicts, based on first section data that is data of the first section $D_{k-L}$ that is a partial section of the time series data, data of the second section $D_k$ that is a partial section of the time series data later than the first section $D_{k-L}$ to obtain predicted second section data (S120). Specifically, the data of the second section is predicted using the first partial time series $x_{k,1}$ of the second section and the feature pattern (Eigenmode $\Phi_{k-L}$ and Eigenvalue $\Lambda_{k-L}$), and the predicted second section data $\hat{x}(1+(k-1)(M+N-1))$, ..., $\hat{x}(N+(k-1)(M+N-1)+M-1)$ is obtained. As described above, the eigenmode $\Phi_{k-L}$ and the eigenvalue $\Lambda_{k-L}$ are acquired by the first acquisition unit 110. The prediction unit 120 obtains $\hat{x}_{k,n}$ for n=2, ..., N as:

$$\hat{x}_{k,n} = \Phi_{k-L} \Lambda_{k-L}^{n-1} \Phi_{k-L}^{-1} x_{k,1}.$$

Alternatively, the prediction unit 120 may first obtain $$b = \Phi_{k-L}^{-1} x_{k,1}, \text{ and}$$

obtain $\hat{x}_{k,n}$ for n=2, ..., N as:

$$\hat{x}_{k,n} = \Phi_{k-L} \Lambda_{k-L}^{n-1} b.$$

Then, the prediction unit 120 may set the first elements of the partial time series $x_{k,1}$ and the predicted partial time series $\hat{x}_{k,2}, \ldots, \hat{X}_{k,N-1}$ as the first to (N−1)th data $\hat{x}(1+(k-1)(M+N-1)), \ldots, \hat{x}(N-1+(k-1)(M+N-1))$ of the predicted second section data, and set all elements of the predicted partial series $\hat{x}_{k,N}$ as the Nth to (M+N−1)th data $\hat{x}(N+(k-1)(M+N-1)), \ldots, \hat{x}(N+(k-1)(M+N-1)+M-1)$ of the predicted second section data. Note that, although "^" is described in front of "x" due to restrictions on expression, it has the same meaning as "^" placed on the top of "x" as illustrated in FIG. 8. Since the predicted second section data is obtained as described above, it is possible to obtain data for evaluating how much the dynamic pattern of the current section (second section) can be expressed by the dynamic feature pattern of the past section (first section).

The anomaly degree acquisition unit 130 acquires a degree of anomaly in the second section based on a difference between the predicted second section data and second section data that is actual data of the second section in the time series data (S130). Specifically, the anomaly degree acquisition unit 130 may acquire, from the predicted second section data $\hat{x}(1+(k-1)(M+N-1)), \ldots, \hat{x}(N+(k-1)(M+N-1)+M-1)$ and the actual data $x(1+(k-1)(M+N-1)), \ldots, x(N+(k-1)(M+N-1)+M-1)$ of the second section in the time series data, a degree of anomaly c(k) as:

$$c(k) = ((\hat{x}(1+(k-1)(M+N-1)) - x(1+(k-1)(M+N-1)))^2 + (\hat{x}(2+(k-1)(M+N-1)) - x(2+(k-1)(M+N-1)))^2 + \ldots + (\hat{x}(t+(k-1)(M+N-1)) - x(t+(k-1)(M+N-1)))^2 + \ldots + ((\hat{x}(k(M+N-1)) - x(k(M+N-1)))^2)^{1/2}.$$

Note that the above expression is:

$$c(k) = \sqrt{\sum_{t=1+(k-1)(M+N-1)}^{k(M+N-1)} (\hat{x}(t) - x(t))^2} \qquad [\text{Math. 5}]$$

which has the same meaning.

The anomaly determination unit 220 determines whether or not an anomaly has occurred in the second section based on the acquired degree of anomaly (S220). For example, a threshold value for the degree of anomaly may be set, and when there is a difference exceeding the threshold value, it may be determined that an anomaly has occurred.

Figure 9:
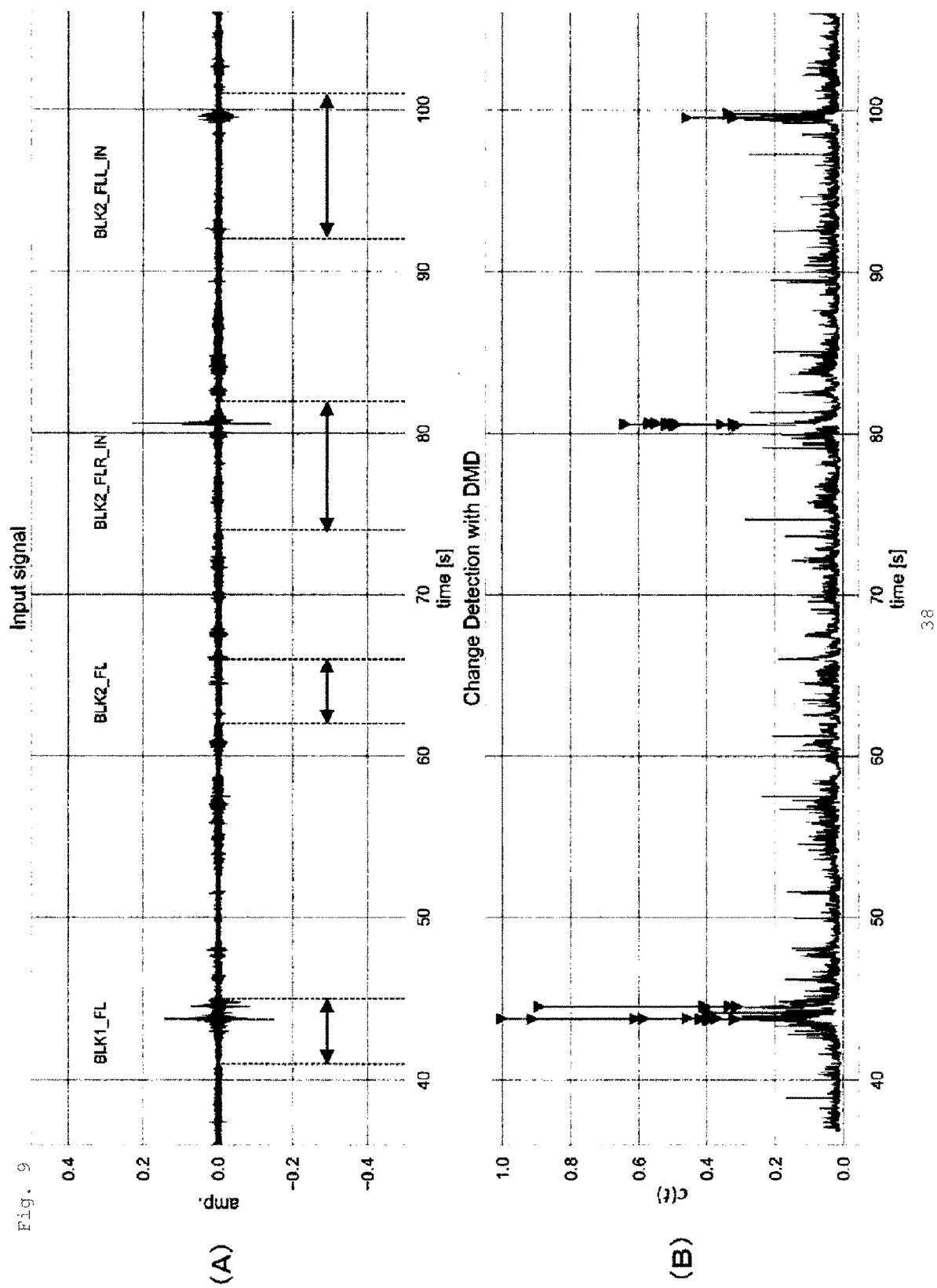
FIG. 9 illustrates results of estimating an anomaly for time series data actually observed in a vehicle by a procedure of the anomaly estimation device according to the present invention.

FIG. 9 illustrates results of estimating an anomaly for time series data actually observed in a vehicle by a procedure of the anomaly estimation device 10 according to the present invention. The vertical axis in (A) of FIG. 9 indicates the amplitude of input time series data, the vertical axis in (B) of FIG. 9 indicates the degree of anomaly, and the horizontal axis of both indicates time. The data in (A) of FIG. 9 is the same as that in (A) of FIG. 5. Similar to the experiment illustrated in FIG. 5, the sampling frequency of time series data used in an experiment was 16 kHz; ranges indicated by arrows in (A) of FIG. 9 are sections in which an anomaly is to be detected. In this experiment, a partial time series was used in which the length was set to M=256, and a history matrix and a test matrix were used in which the number of columns was set to N=128 and the lag was set to L=128. Further, the number of ranks r was set to the number of top singular vectors having singular values whose cumulative contribution rate is up to 80%. In (B) of FIG. 9, a threshold value for a degree of anomaly is set to 0.3, and points where the degree of anomaly exceeds the threshold value are each marked with a triangle in order to emphasize the points determined to be anomalies. The setting of this threshold value corresponds to the above-mentioned anomaly determination unit 220. In (B) of FIG. 9, it can be seen that points determined to be anomalies are concentrated in sections where an anomaly is to be detected. In particular, in (B) of FIG. 9, only large vibrations around 43 seconds, 81 seconds, and 99 seconds are detected. Therefore, according to the anomaly estimation device of the present invention, a range where there is no anomaly can be excluded, so that it is possible to limit images to be checked to investigate the cause of a scratch on a vehicle available for multiple users.

Second Embodiment

<Anomaly Detection Device of the Present Invention>

In the first embodiment, the application is limited to a vehicle available for multiple users such as a shared vehicle and a rental car. However, the present invention can be widely applied to time series data in which a feature pattern may change over time. In other words, the data to be acquired by the sensor does not have to be limited to data related to vibration. Accordingly, in a second embodiment, an anomaly detection device will be described that receives input of some time series data and outputs a degree of anomaly for which an anomaly is likely to be detected.

Figure 10:
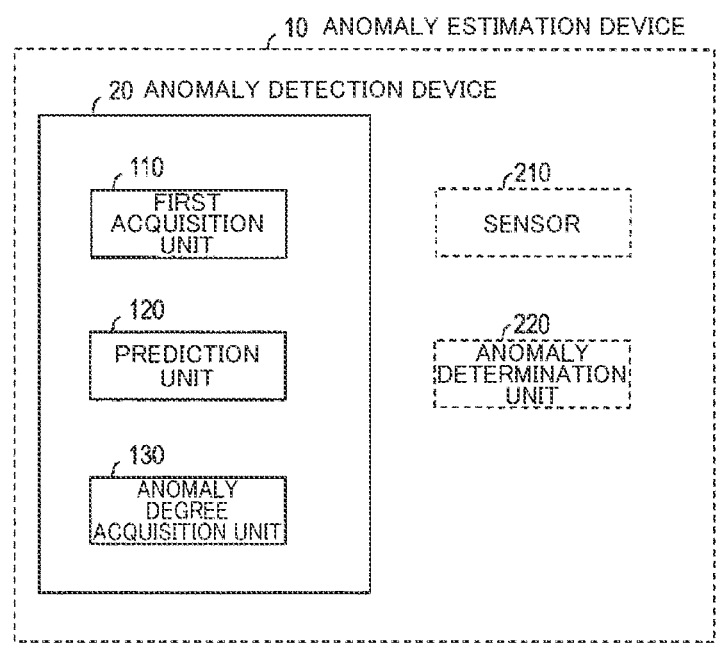
FIG. 10 illustrates a functional configuration example of an anomaly detection device.
Figure 11:
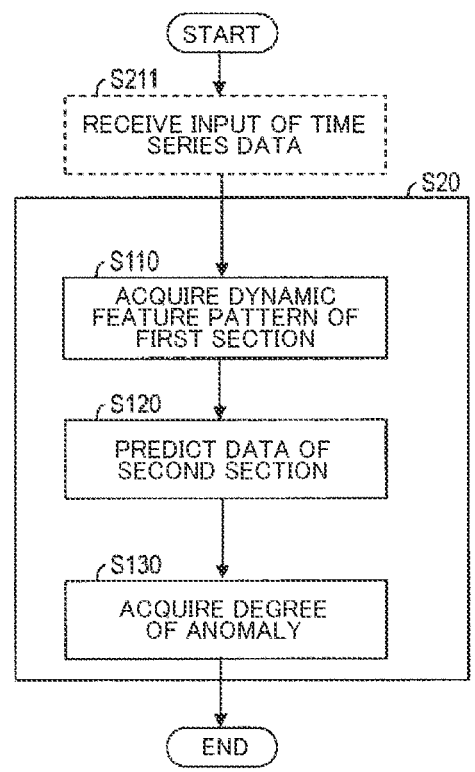
FIG. 11 illustrates an example of a processing flow of the anomaly detection device.

FIG. 10 illustrates an example of a functional configuration of the anomaly detection device of the present invention, and FIG. 11 illustrates an example of a processing flow of the anomaly detection device of the present invention. The anomaly detection device 20 is a device for detecting a degree of anomaly in time series data. The anomaly detection device 20 includes the first acquisition unit 110, the prediction unit 120, and the anomaly degree acquisition unit 130. In order to show the relationship with the anomaly estimation device 10 of the first embodiment, the anomaly estimation device 10, the sensor 210, and the anomaly determination unit 220 are illustrated by dotted lines in FIG. 10.

The anomaly detection device 20 receives time series data x(i) as input (S211). The first acquisition unit 110 acquires, from the first section (past section) $D_{k-L}$, that is a partial section of the time series data, a dynamic feature pattern of the first section (S110). The prediction unit 120 predicts, based on first section data that is data of the first section $D_{k-L}$ that is a partial section of the time series data, data of the second section $D_k$ that is a partial section of the time series data later than the first section $D_{k-L}$ to obtain predicted second section data (S120). The anomaly degree acquisition unit 130 acquires a degree of anomaly in the second section based on a difference between the predicted second section data and second section data that is actual data of the second section in the time series data (S130). Steps S110, S120, and S130 are the same as in the first embodiment.

In the method of obtaining the degree of change from a degree of overlap between the eigenmode of the past section and the eigenmode of the current section as described as Candidate 2 in the first embodiment, an eigenvalue representing a damping (increase) rate is not taken into consideration. Therefore, even if there is an eigenmode with the same frequency, in a case where a damping feature pattern is for the past section and an increase feature pattern is for the current section, they are distinguished only by comparing their eigenmodes, so that a degree of change available for anomaly detection cannot be acquired.

According to the present invention, a dynamic feature pattern of the section of interest can be estimated only from time series data, so that the accuracy of estimating a degree of change of the time series data obtained from a system in which the situation changes dynamically is improved, and thus the detection accuracy of the changed part is improved. Since the feature pattern extracted in the observation section is a signal corresponding to an eigenmode (eigenfrequency), the data can be easily interpreted. Therefore, according to the anomaly detection device of the present invention, the predicted second section data is obtained based on the dynamic feature pattern, so that it is possible to acquire the degree of anomaly required for anomaly detection even when the feature pattern of the time series data changes over time.

[Program, Storage Medium]

Figure 12:
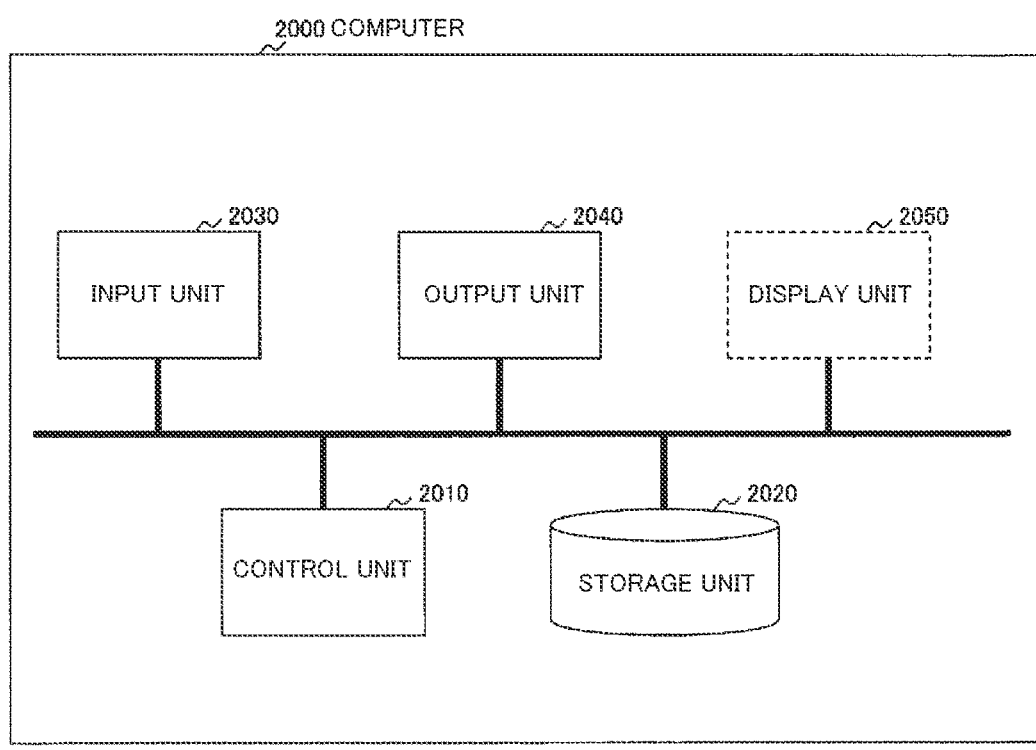
FIG. 12 illustrates a configuration of a computer.

The various types of processing described above can be performed in a manner that a program for executing the respective steps of the above method is loaded on a storage unit 2020 of a computer illustrated in FIG. 12 and operates through a control unit 2010, an input unit 2030, an output unit 2040, and the like.

The program describing the processing content can be stored in a computer-readable storage medium. The computer-readable storage medium may be, for example, a magnetic storage device, an optical disk, a magneto-optical storage medium, a semiconductor memory, or the like.

Further, the distribution of such a program is performed, for example, by selling, transferring, or renting a portable storage medium such as a DVD or CD-ROM in which the program is stored. In addition, the program may be stored in a storage device of a server computer, and then the program may be distributed by being transferred from the server computer to another computer via a network.

A computer that executes such a program first temporarily stores, for example, the program stored in a portable storage medium or the program transferred from a server computer in its own storage device. Then, to execute processing, the computer reads the program stored in its own storage medium and executes the processing according to the read program. Further, as another execution form of this program, a computer may read the program directly from a portable storage medium and execute processing according to the program, and also, every time the program is transferred from a server computer to this computer, processing according to the received program may be executed sequentially. Further, the above-mentioned processing may be executed by a so-called ASP (Application Service Provider) type service, which implements processing function only by executing a program in accordance with an instruction and acquiring a result without transferring the program from a server computer to this computer. Note that the program in this form includes information to be used for processing performed by a computer and equivalent to the program (data that is not a direct command to the computer but has a property for defining the processing of the computer, etc.).

Further, in this form, the present device is configured by executing a predetermined program on a computer, but at least a part of these processing contents may be realized by hardware.

REFERENCE SIGNS LIST

10 Anomaly estimation device
20 Anomaly detection device
110 First acquisition unit
120 Prediction unit
130 Anomaly degree acquisition unit
210 Sensor
220 Anomaly determination unit

The invention claimed is:

1. An anomaly estimation device for estimating the time when an anomaly occurred in a vehicle available for a plurality of users, the anomaly estimation device comprising:
 a processor; and
 a memory storing computer-executable instructions that when executed by the processor cause the device to execute a method comprising:
  acquiring, using a sensor attached to the vehicle, first time series data indicating vibration of the vehicle over a first time period, wherein the first time series data includes first section data, and the first section data indicates vibration of the vehicle during a first section within the first time series data;

predicting, based on the first section data, prediction time series data of a second section, wherein the second section is subsequent to the first section;

acquiring, using the sensor attached to the vehicle, second time series data indicating vibration of the vehicle over a second time period, wherein the second time period is subsequent to the first time period, and the second time period as an actual time period coincides with the second section;

acquiring a degree of anomaly in the second section based on a difference between the prediction time series data and the second time series data, wherein the prediction time series data is based on an eigenmode and an eigenvalue of the data of the first section, and the second time series data is based at least on the eigenmode and the eigenvalue;

determining whether an anomaly has occurred in the second section based on the degree of anomaly; and causing, based on the determination of the anomaly occurred in the second section, an application to exclude one or more frames of images to the second time period, wherein the one or more frames of images depict the vehicle to investigate a cause of the anomaly while being driven by one of the plurality of users.

2. The anomaly estimation device according to claim 1, the computer-executable instructions when executed further causing the device to execute a method comprising:

acquiring a dynamic feature pattern of vibration of the object during the first section of the first time period, wherein
the predicting further comprises predicting the prediction time series data using the dynamic feature pattern.

3. An anomaly detection device that detects a degree of anomaly in time series data, the anomaly detection device comprising:

a processor; and a memory storing computer-executable instructions that when executed by the processor cause the device to execute a method comprising:

acquiring, using a sensor attached to the vehicle, first time series data indicating vibration of the vehicle over a first time period, wherein the first time series data includes first section data, and the first section data indicates vibration of the vehicle during a first section within the first time series data;

acquiring, from the first section, a dynamic feature pattern of vibration of the object during the first section of the first time period;

predicting prediction time series data that is a partial section of the time series data later than the first section by using the dynamic feature pattern to obtain prediction time series data of a second section, wherein the second section is subsequent to the first section;

acquiring, using the sensor attached to the vehicle, second time series data indicating vibration of the vehicle over a second time period, wherein the second time period is subsequent to the first time period, and the second time period as an actual time period coincides with the second section;

acquiring a degree of anomaly based on a difference between the prediction time series data and the second time series data as actual data of the second section in the time series data, wherein the prediction time series data is based on an eigenmode and an eigenvalue of the data of the first section, and the second time series data is based at least on the eigenmode and the eigenvalue; and causing, based on the degree of anomaly occurred in the second section, an application to exclude one or more frames of images to the second time period, wherein the one or more frames of images depict the vehicle to investigate a cause of the anomaly while being driven by one of the plurality of users.

4. An anomaly detection device that detects a degree of anomaly in time series data, the anomaly detection device comprising:

a processor; and a memory storing computer-executable instructions that when executed by the processor cause the device to execute a method comprising:

acquiring, using a sensor attached to the vehicle, first time series data indicating vibration of the vehicle over a first time period, wherein the first time series data includes first section data, and the first section data indicates vibration of the vehicle during a first section within the first time series data;

acquiring, based on the first time series data, a feature pattern related to periodic vibration in the first section and a damping rate of the periodic vibration;

predicting, based on the feature pattern, prediction time series data of a second section, wherein the second section is subsequent to the first section;

acquiring, using the sensor attached to the vehicle, second time series data indicating vibration of the vehicle over a second time period, wherein the second time period is subsequent to the first time period, and the second time period as an actual time period coincides with the second section;

acquiring a degree of anomaly based on a difference between the prediction time series data and the second time series data as actual data of the second section in the time series data, wherein the prediction time series data is based on an eigenmode and an eigenvalue of the data of the first section, and the second time series data is based at least on the eigenmode and the eigenvalue;

determining whether an anomaly has occurred in the second section based on the degree of anomaly; and causing, based on the determination of the anomaly occurred in the second section, an application to exclude one or more frames of images to the second time period, wherein the one or more frames of images depict the vehicle to investigate a cause of the anomaly while being driven by one of the plurality of users.

5. The anomaly detection device according to claim 2, wherein the acquiring the dynamic feature pattern further comprises obtaining the eigenmode and the eigenvalue by a dynamic mode decomposition for the data of the first section, wherein the predicting further comprises predicting the prediction time series data of the second section later than the first section using a predetermined number of first pieces of data of the second section, the eigenmode, and the eigenvalue to obtain prediction time series data.

6. The anomaly detection device according to claim 1, wherein the acquiring the dynamic feature pattern further comprises using, for data of the first section, $x(1+(k-L-1)(M+N-1)), \ldots, x(N+(k-L-1)(M+N-1)+M-1)$, a low-rank approximated pseudo-inverse matrix $X_{k-L,1}^+$ obtained based on a result of singular value decomposition for $X_{k-L,1}$ to obtain a linear operator A as $$A = X_{k-L,2} X_{k-L,1}^+, \text{ and}$$

obtains an eigenmode $\Phi_{k-L}$ and an eigenvalue $\Lambda_{k-L}$ that satisfy $$A = \Phi_{k-L} \Phi_{k-L} \Phi_{k-L}^{-1},$$

where M, N are integers of 2 or more, n is an integer of 1 or more and N or less, L is an integer of 1 or more, k is an integer of L+1 or more, i is an integer of 1 or more, t is an integer of 1 or more and M+N−1 or less, [ ] is a symbol indicating a matrix in which numerical values are arranged in a row direction or in which column vectors are arranged in a row direction, T is a symbol indicating transpose, and x(i) is the time series data, $x_{k,n}$ is a column vector as $x_{k,n} = [x(n+(k-1)(M+N-1)), \ldots, x(n+(k-1)(M+N-1)+M-1)]$, $X_{k-L,1}$ is a matrix as $X_{k-L,1} = [x_{k-L,1} \cdots x_{k-L,n} \cdots x_{k-L,N}^{-1}]$, and $X_{k-L,2}$ is a matrix as $X_{k-L,2} = [x_{k-L,2} \cdots x_{k-L,n} \cdots x_{k-L,N}]$;

wherein the predicting predicts the data of the second section that is the partial section of the time series data later than the first section as $$\hat{x}_{k,n} = \Phi_{k-L} \Lambda_{k-L}^{n-1} \Phi_{k-L} x_{k,1}$$

to obtain the prediction time series data $\hat{x}(1+(k-1)(M+N-1)), \ldots, \hat{x}(N+(k-1)(M+N-1)+M-1)$; and wherein the acquiring the degree of anomaly further comprises acquiring, from prediction time series data $\hat{x}(1+(k-1)(M+N-1)), \ldots, \hat{x}(N+(k-1)(M+N-1)+M-1)$ and actual data $x(1+(k-1)(M+N-1)), \ldots, x(N+(k-1)(M+N-1)+M-1)$ of the second section in the second time series data, a degree of anomaly c(k) as:

$c(k) = ((\hat{x}(1+(k-1)(M+N-1)) - x(1+(k-1)(M+N-1)))^2 + (\hat{x}(2+(k-1)(M+N-1)) - x(2+(k-1)(M+N-1)))^2 + \ldots, +(\hat{x}(t+(k-1)(M+N-1)) - x(t+(k-1)(M+N-1)))^2 + \ldots, +((\hat{x}(k(M+N-1)) - x(k(M+N-1)))^2)^{1/2}$.

7. The anomaly detection device according to claim 3, the computer-executable instructions when executed further causing the device to execute a method comprising:
acquiring the dynamic feature pattern of the first section, wherein
the predicting further comprises predicting the prediction time series data using the dynamic feature pattern.

8. The anomaly detection device according to claim 3, wherein the acquiring the dynamic feature pattern further comprises obtaining the eigenmode and the eigenvalue by a dynamic mode decomposition for the data of the first section,
wherein the predicting further comprises predicting the prediction time series data of the second section later than the first section using a predetermined number of first pieces of data of the second section, the eigenmode, and the eigenvalue to obtain prediction time series data.

9. The anomaly detection device according to claim 3, wherein the acquiring the dynamic feature pattern further comprises using, for data of the first section, $x(1+(k-L-1)(M+N-1)), \ldots, x(N+(k-L-1)(M+N-1)+M-1)$, a low-rank approximated pseudo-inverse matrix $X_{k-L,1}^+$ obtained based on a result of singular value decomposition for $X_{k-L,1}$ to obtain a linear operator A as $$A = X_{k-L,2} X_{k-L,1}^+, \text{ and}$$

obtains an eigenmode $\Phi_{k-L}$ and an eigenvalue $\Lambda_{k-L}$ that satisfy $$A = \Phi_{k-L} \Lambda_{k-L} \Phi_{k-L}^{-1},$$

where M, N are integers of 2 or more, n is an integer of 1 or more and N or less, L is an integer of 1 or more, k is an integer of L+1 or more, i is an integer of 1 or more, t is an integer of 1 or more and M+N−1 or less, [ ] is a symbol indicating a matrix in which numerical values are arranged in a row direction or in which column vectors are arranged in a row direction, T is a symbol indicating transpose, and x(i) includes the first time series data, $x_{k,n}$ is a column vector as $x_{k,n} = [x(n+(k-1)(M+N-1)), \ldots, x(n+(k-1)(M+N-1)+M-1)]$, $X_{k-L,1}$ is a matrix as $X_{k-L,1} = [x_{k-L,1} \cdots x_{k-L,n} \cdots x_{k-L,N}^{-1}]$, and $X_{k-L,2}$ is a matrix as $X_{k-L,2} = [x_{k-L,2} \cdots x_{k-L,n} \cdots x_{k-L,N}]$;

wherein the predicting further comprises predicting the prediction time series data as $$\hat{x}_{k,n} = \Phi_{k-L} \Lambda_{k-L}^{n-1} \Phi_{k-L} x_{k,1}$$

to obtain the prediction time series data $\hat{x}(1+(k-1)(M+N-1)), \ldots, \hat{x}(N+(k-1)(M+N-1)+M-1)$; and wherein the acquiring the degree of anomaly further comprises acquiring, from the prediction time series data $\hat{x}(1+(k-1)(M+N-1)), \ldots, \hat{x}(N+(k-1)(M+N-1)+M-1)$ and actual data $x(1+(k-1)(M+N-1)), \ldots, x(N+(k-1)(M+N-1)+M-1)$ of the second section in the second time series data, a degree of anomaly c(k) as:

$c(k) = ((\hat{x}(1+(k-1)(M+N-1)) - x(1+(k-1)(M+N-1)))^2 + (\hat{x}(2+(k-1)(M+N-1)) - x(2+(k-1)(M+N-1)))^2 + \ldots, +(\hat{x}(t+(k-1)(M+N-1)) - x(t+(k-1)(M+N-1)))^2 + \ldots, +((\hat{x}(k(M+N-1)) - x(k(M+N-1)))^2)^{1/2}$.

10. The anomaly detection device according to claim 4, the computer-executable instructions when executed further causing the device to execute a method comprising:
acquiring a dynamic feature pattern of the first section, wherein
the predicting further comprises predicting the prediction time series data using the feature pattern.

11. The anomaly detection device according to claim 4, wherein the acquiring the dynamic feature pattern further comprises obtaining the eigenmode and the eigenvalue by a dynamic mode decomposition for the data of the first section,
wherein the predicting further comprises predicting the prediction time series data of the second section later than the first section using a predetermined number of first pieces of data of the second section, the eigenmode, and the eigenvalue to obtain prediction time series data.

12. The anomaly detection device according to claim 4, wherein the acquiring the dynamic feature pattern further comprises using, for data of the first section, $x(1+(k-L-1)(M+N-1)), \ldots, x(N+(k-L-1)(M+N-1)+M-1)$, a low-rank approximated pseudo-inverse matrix $X_{k-L,1}^+$ obtained based on a result of singular value decomposition for $X_{k-L,1}$ to obtain a linear operator A as $$A = X_{k-L,2} X_{k-L,1}^+, \text{ and}$$

obtains an eigenmode $\Phi_{K-L}$ and an eigenvalue $\Lambda_{k-L}$ that satisfy $$A=\Phi_{k-L}\Lambda_{k-L}\Phi_{k-L}^{-1},$$

where M, N are integers of 2 or more, n is an integer of 1 or more and N or less, L is an integer of 1 or more, k is an integer of L+1 or more, i is an integer of 1 or more, t is an integer of 1 or more and M+N−1 or less, [ ] is a symbol indicating a matrix in which numerical values are arranged in a row direction or in which column vectors are arranged in a row direction, T is a symbol indicating transpose, and x(i) includes the first time series data, $x_{k,n}$ is a column vector as $x_{k,n}=[x(n+(k-1)(M+N-1)), \ldots, x(n+(k-1)(M+N-1)+M-1)]$, $X_{k-L,1}$ is a matrix as $X_{k-L,1}=[x_{k-L,1} \cdots x_{k-L,n} \cdots x_{k-L,N}^{-1}]$, and $X_{k-L,2}$ is a matrix as $X_{k-L,2}=[x_{k-L,2} \cdots x_{k-L,n} \cdots x_{k-L,N}]$;

wherein the predicting further comprises predicting the prediction time series data as $$\hat{x}_{k,n}=\Phi_{k-L}\Lambda_{k-L}^{n-1}\Phi_{k-L}x_{k,1}$$

to obtain the prediction time series data $\hat{x}(1+(k-1)(M+N-1)), \ldots, \hat{x}(N+(k-1)(M+N-1)+M-1)$; and wherein the acquiring the degree of anomaly further comprises acquiring, from prediction time series data $\hat{x}(1+(k-1)(M+N-1)), \ldots, \hat{x}(N+(k-1)(M+N-1)+M-1)$ and actual data $x(1+(k-1)(M+N-1)), \ldots, x(N+(k-1)(M+N-1)+M-1)$ of the second section in the second time series data, a degree of anomaly c(k) as:

$$c(k)=((\hat{x}(1+(k-1)(M+N-1))-x(1+(k-1)(M+N-1)))^2+ \\ (\hat{x}(2+(k-1)(M+N-1))-x(2+(k-1)(M+N-1)))^2+\ldots,+(\hat{x}(t+(k-1)(M+N-1))-x(t+(k-1)(M+N-1)))^2+,\ldots,+((\hat{x}(k(M+N-1))-x(k(M+N-1)))^2)^{1/2}.$$

13. The anomaly detection device according to claim 1, wherein the vibration is associated with the vehicle.

14. The anomaly detection device according to claim 1, wherein the anomaly includes a crash of the vehicle.

15. The anomaly detection device according to claim 3, wherein the time series is associated with vibration of a vehicle.

16. The anomaly detection device according to claim 3, wherein the anomaly includes a crash of a vehicle.

17. The anomaly detection device according to claim 4, wherein the periodic vibration is associated with a vehicle.

18. The anomaly detection device according to claim 4, wherein the anomaly includes a crash of a vehicle.

\* \* \* \* \*